United States Patent
Suzuki et al.

(10) Patent No.: US 9,983,781 B2
(45) Date of Patent: May 29, 2018

(54) SEAT STATE CORRECTION SYSTEM, SEAT STATE CORRECTION METHOD, AND SEAT STATE CORRECTION PROGRAM

(71) Applicant: AISIN AW CO., LTD., Anjo-shi, Aichi-ken (JP)

(72) Inventors: Yukiyoshi Suzuki, Okazaki (JP); Tomoki Kubota, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 156 days.

(21) Appl. No.: 15/026,209

(22) PCT Filed: Oct. 21, 2014

(86) PCT No.: PCT/JP2014/077907
§ 371 (c)(1),
(2) Date: Mar. 30, 2016

(87) PCT Pub. No.: WO2015/064417
PCT Pub. Date: May 7, 2015

(65) Prior Publication Data
US 2016/0239175 A1    Aug. 18, 2016

(30) Foreign Application Priority Data
Oct. 31, 2013 (JP) ................................. 2013-226711

(51) Int. Cl.
*G06F 3/041* (2006.01)
*G06F 3/0488* (2013.01)
(Continued)

(52) U.S. Cl.
CPC ......... *G06F 3/0488* (2013.01); *B60N 2/0244* (2013.01); *B60N 2/0252* (2013.01);
(Continued)

(58) Field of Classification Search
CPC .............. G06F 3/0488; G06F 3/04842; G06F 3/04817; B60N 2/0252; B60N 2/0244;
(Continued)

(56) References Cited

U.S. PATENT DOCUMENTS

2012/0086249 A1    4/2012    Hotary et al.
2013/0090816 A1    4/2013    Huber
(Continued)

FOREIGN PATENT DOCUMENTS

CN    103029599 A    4/2013
CN    103221257 A    7/2013
(Continued)

*Primary Examiner* — Adam R Giesy
(74) *Attorney, Agent, or Firm* — Oliff PLC

(57) ABSTRACT

Seat state correction systems, methods, and programs access suitable figure information in which a suitable figure and a state of a seat of a vehicle are correlated with each other. The systems, methods, and programs acquire a suitable figure that suits a current state of the seat on the basis of the accessed suitable figure information, the acquired suitable figure representing a recommended driving posture for a user seated on the seat and display, on a touch panel display, an image that indicates the acquired suitable figure. The systems, methods, and programs receive figure correction information through contact on the touch panel display, the figure correction information indicating a correction of the displayed suitable figure and correct the state of the seat on the basis of the accessed suitable figure information so as to achieve a state of the seat corresponding to the corrected displayed suitable figure.

10 Claims, 5 Drawing Sheets

(51) Int. Cl.
    *G01C 21/26*     (2006.01)
    *B60N 2/02*     (2006.01)
    *G06F 3/0481*     (2013.01)
    *G06F 3/0484*     (2013.01)
    *B60R 16/037*     (2006.01)

(52) U.S. Cl.
    CPC ......... *G01C 21/26* (2013.01); *G06F 3/04817* (2013.01); *G06F 3/04842* (2013.01); *B60N 2002/026* (2013.01); *B60R 16/037* (2013.01)

(58) Field of Classification Search
    CPC ...... B60N 2002/026; B60N 2/02; B60N 2/44; G01C 21/26; B60R 16/037
    See application file for complete search history.

(56) References Cited

U.S. PATENT DOCUMENTS

| | | | |
|---|---|---|---|
| 2014/0265479 A1* | 9/2014 | Bennett | ........... B60N 2/502 297/217.4 |
| 2015/0145296 A1 | 5/2015 | Hotary et al. | |
| 2016/0339804 A1 | 11/2016 | Hotary et al. | |

FOREIGN PATENT DOCUMENTS

| | | | |
|---|---|---|---|
| JP | 2005-271770 A | 10/2005 | |
| JP | 2006-159964 A | 6/2006 | |
| JP | 2009-143457 A | 7/2009 | |
| JP | 2010-006163 A | 1/2010 | |

\* cited by examiner

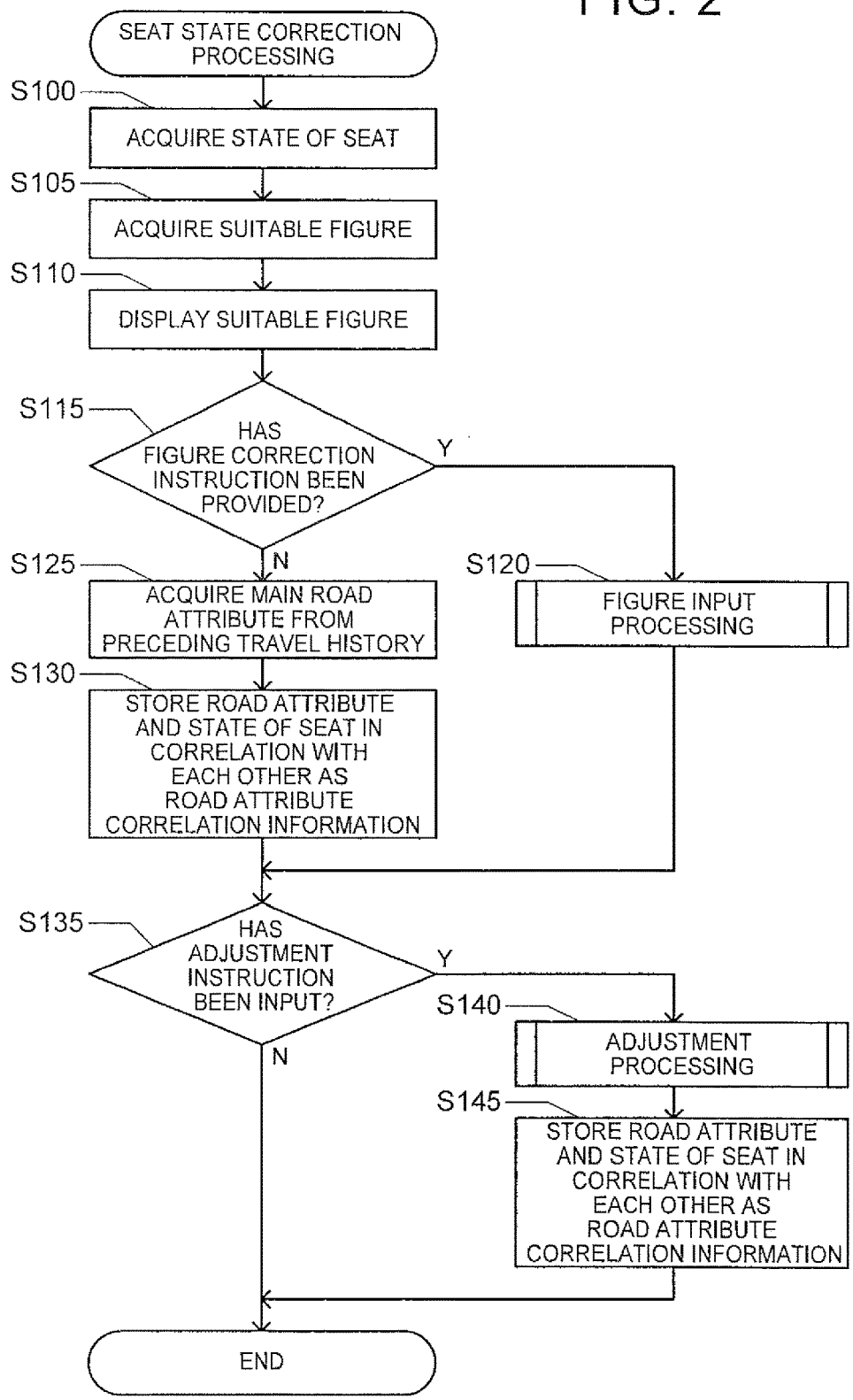

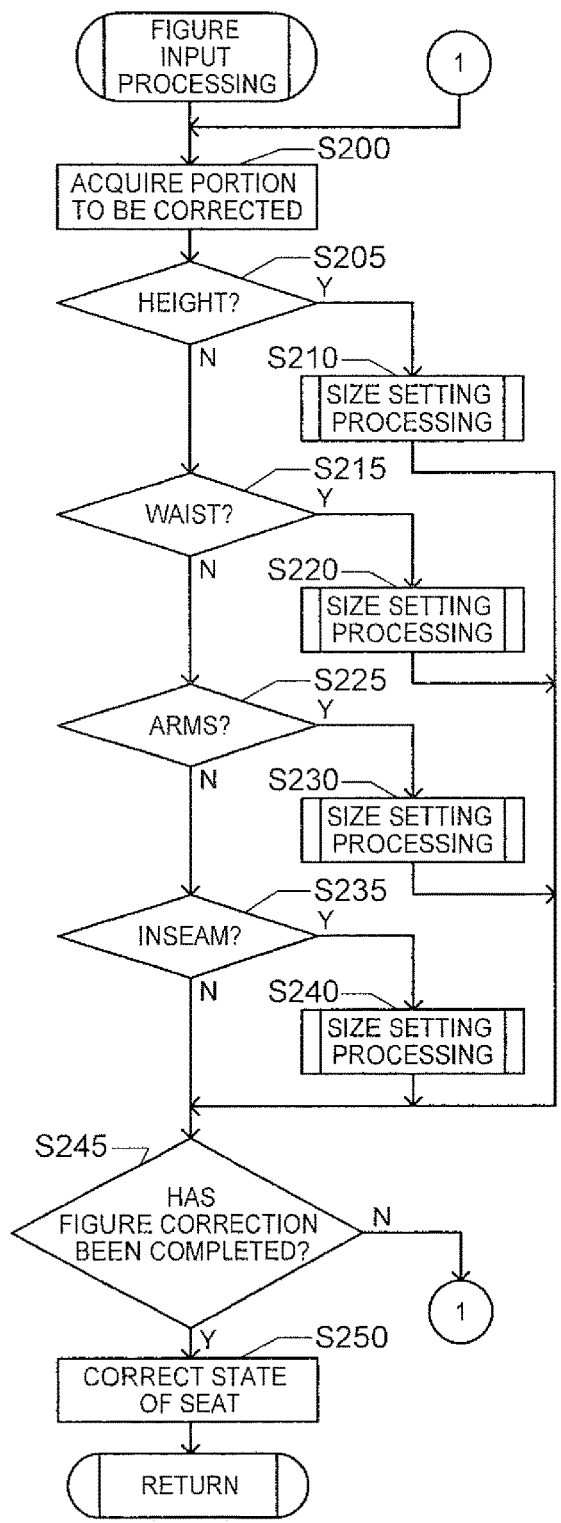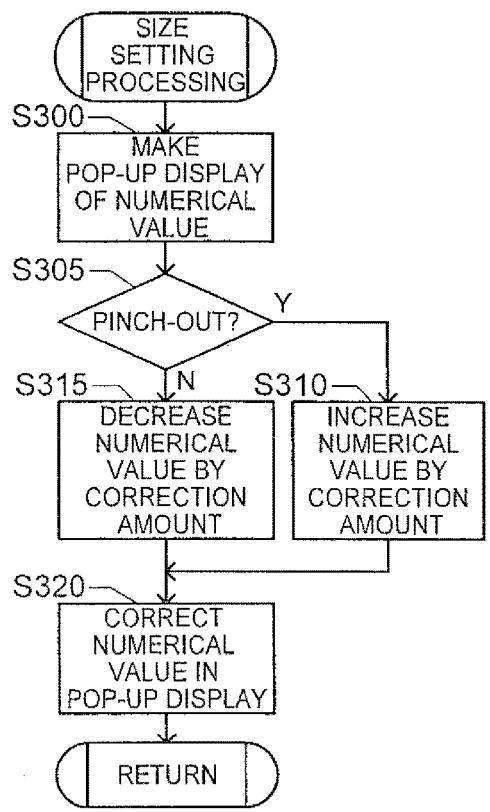
FIG. 3A
FIG. 3B

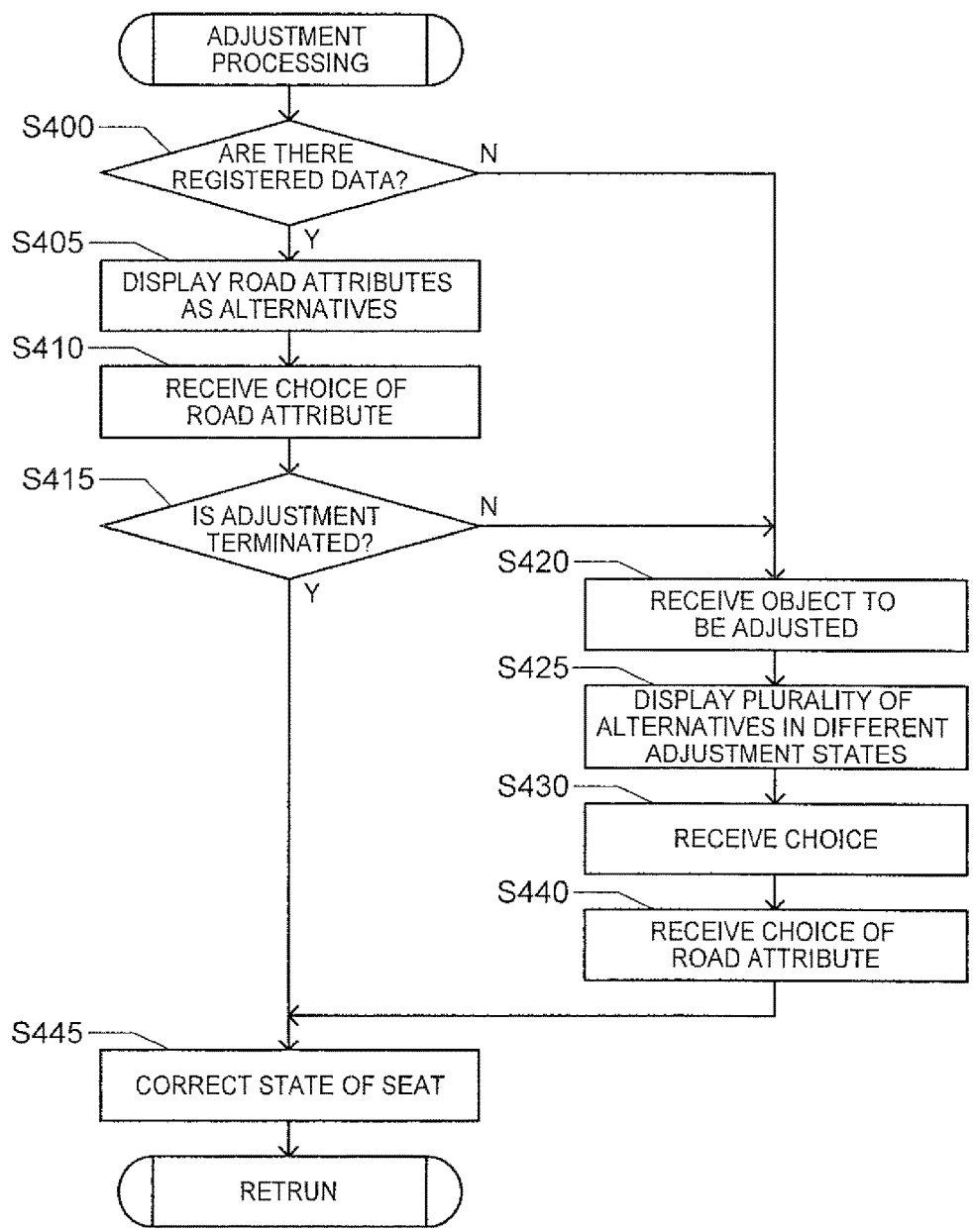

SEAT STATE CORRECTION SYSTEM, SEAT STATE CORRECTION METHOD, AND SEAT STATE CORRECTION PROGRAM

TECHNICAL FIELD

Related technical fields include seat state correction systems, methods, and programs for correction of the state of a seat.

BACKGROUND ART

Various technologies for correcting the state of a seat of a vehicle have hitherto been known. For example, Japanese Patent Application Publication No. 2010-6163 (JP 2010-6163 A) discloses a system that reads figure information on a driver to determine a recommended driving posture, and that informs the driver that the recommended driving posture and the current driving posture are different from each other in the case where the recommended driving posture and the current driving posture are different from each other. It is assumed that the figure information is stored in a storage device carried by the driver or a storage section that is subordinate to a device that reads the figure information.

SUMMARY

In the system according to the related art, in order to correct the state of a seat, it is necessary to define figure information in advance, and to have the figure information stored in a storage device or the like. Meanwhile, there has not hitherto been a technology that allows easy input of figure information with figure information not defined in advance. Therefore, it has not been possible to correct the state of a seat so as to suit a figure through easy input in the case where the current state of the seat does not suit the figure.

Exemplary embodiments of the broad inventive principles described herein solve the foregoing issue, and therefore have an object to provide a technology that enables the state of a seat to be corrected so as to suit a figure through easy input.

In order to achieve the foregoing object, exemplary embodiments provide a seat state correction systems, methods, and programs that access suitable figure information in which a suitable figure and a state of a seat of a vehicle are correlated with each other. The systems, methods, and programs acquire a suitable figure that suits a current state of the seat on the basis of the accessed suitable figure information, the acquired suitable figure representing a recommended driving posture for a user seated on the seat and display, on a touch panel display, an image that indicates the acquired suitable figure. The systems, methods, and programs receive figure correction information through contact on the touch panel display, the figure correction information indicating a correction of the displayed suitable figure and correct the state of the seat on the basis of the accessed suitable figure information so as to achieve a state of the seat corresponding to the corrected displayed suitable figure.

As described above, with the seat state correction system, method, and program, figure correction of the suitable figure is received through contact on the touch panel display, and the state of the seat is corrected so as to suit the figure correction. That is, when receiving an instruction for correcting the state of the seat, direct correction of the state of the seat (such as correction of the seat position) is not received, but indirect correction, that is, figure correction of the suitable figure, is received. According to the configuration, the user can correct the state of the seat using information that is easily recognizable by the user himself/herself, namely the figure. In addition, since the object to be corrected is the figure, it is easy to provide a correction instruction for achieving a state of the seat that suits the figure.

With the seat state correction system, method, and program, further, information on the figure itself (such as a height value) is not input in the absence of any reference value in order to correct the state of the seat, but an instruction for figure correction can be provided by providing an instruction for correcting the figure with reference to the suitable figure through contact on the touch panel display. Thus, the state of the seat can be corrected to suit the figure through easy input.

BRIEF DESCRIPTION OF THE DRAWINGS

FIG. 2 is a flowchart of seat state correction processing.

FIG. 3A is a flowchart of figure input processing, and FIG. 3B is a flowchart of size setting processing.

FIG. 4 is a flowchart of adjustment processing.

DETAILED DESCRIPTION OF EXEMPLARY EMBODIMENTS

An embodiment will be described below in the following order:
(1) Configuration of Navigation System
(2) Seat State Correction Processing
(2-1) Figure Input Processing
(2-3) Size Setting Processing
(2-3) Adjustment Processing
(3) Other Embodiments

(1) Configuration of Navigation System

Figure 1:
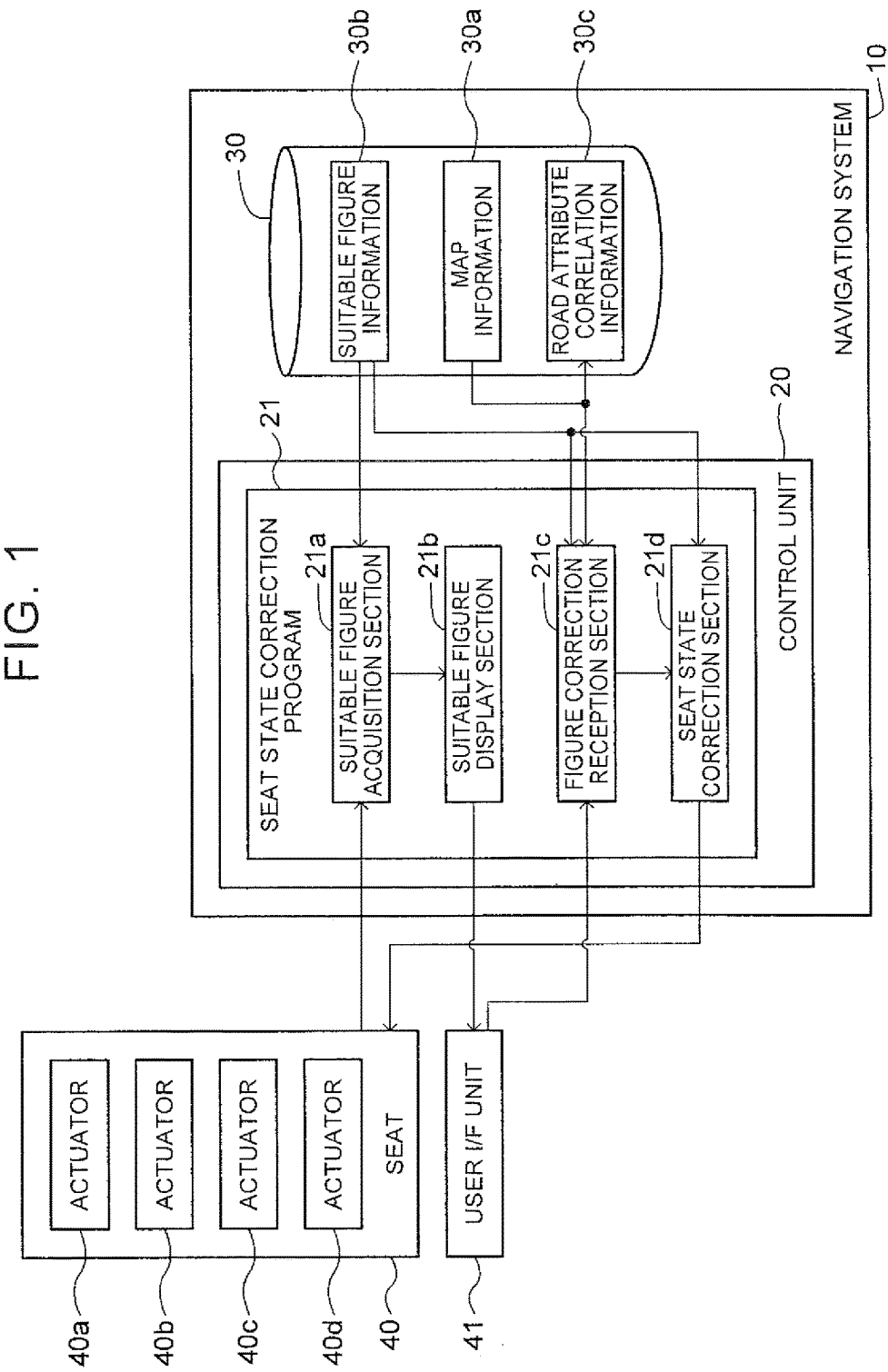
FIG. 1 is a block diagram of a navigation system that includes a seat state correction system.

FIG. 1 is a block diagram illustrating the configuration of a navigation system 10 that includes a seat state correction system. The navigation system 10 includes a control unit 20 that includes a CPU, a RAM, a ROM, and so forth, and a storage medium 30, as various types of storage mediums. (As used herein, the term "storage medium" is not intended to encompass transitory signals.) The control unit 20 can execute programs stored in the storage medium 30 and the ROM. In the embodiment, a navigation program can be performed as one of the programs. The navigation program includes a seat state correction program 21 as a program module that implements one of the functions of the navigation program. The control unit 20 executes the seat state correction program 21 to cause the navigation system 10 to function as a seat state correction system for correction of the state of a seat.

The storage medium 30 stores map information 30a in advance. The map information 30a includes node data that indicate the position of nodes set on roads on which the vehicle travels, shape interpolation point data for specifying the shape of the roads between the nodes, link data that indicate coupling between the nodes, feature information that indicates a plurality of features that are present on or around the roads, and so forth. Furthermore, the link data are correlated with information that indicates the road attribute of a road corresponding to each link. In the embodiment, the road attribute is constituted of a highway, a general road, and a narrow street.

The vehicle which includes the navigation system 10 includes a GPS reception section, a vehicle speed sensor, a gyro sensor, and so forth (not illustrated). The control unit 20 can specify the current position of the vehicle on the basis of an output signal from the GPS reception section, the vehicle speed sensor, the gyro sensor, and so forth and the map information 30a. In addition, the control unit 20 can execute the navigation program to search for a route to a destination location, compare the current position of the vehicle and the route, provide route guidance that allows the vehicle to travel along the route, etc.

Furthermore, the vehicle includes a plurality of seats 40. The seats 40 are each constituted of a plurality of portions (e.g. a seat surface portion, a backrest portion, and a headrest portion). At least some of the plurality of portions constituting the seat 40 are movable portions, which may be moved or changed in posture in order to vary the state of the seat 40. In the embodiment, a plurality of actuators (in the example illustrated in FIG. 1, 40a to 40d) are provided inside the seat 40, and the position and the posture of the movable portions can be changed by driving the respective actuators. That is, the front-rear position of the seat surface portion, the height of the seat surface portion, the angle of the backrest portion, and the position of a side support of the backrest portion (back support strength of the side support) can be varied within a movable range.

The control unit 20 is connected to the actuators 40a to 40d via an interface (not illustrated). The control unit 20 can output a control signal to the actuators 40a to 40d to drive the actuators 40a to 40d. Thus, the state of the seat 40 can be adjusted in accordance with an instruction from the control unit 20. In addition, the control unit 20 can output a control signal to the actuators 40a to 40d to cause the actuators 40a to 40d to output a signal that indicates the current state, and can specify the state (such as position and posture) of the movable portions on the basis of the signal. That is, the state of the seat 40 can be acquired in accordance with an instruction from the control unit 20.

A user I/F unit 41 is an interface section that receives input of an instruction from a user and that provides various kinds of information to the user, and includes a display section that also serves as an input section constituted of a touch panel display (not illustrated), and an output section for output sound such as a speaker.

When the seat state correction program 21 is started, through processing performed by the seat state correction program 21, the control unit 20 displays a user interface (UI) for correcting the state of the seat 40 on the user I/F unit 41, and receives an instruction for correcting the state of the seat 40 through contact on the touch panel display.

To this end, the seat state correction program 21 includes a suitable figure acquisition section 21a, a suitable figure display section 21b, a figure correction reception section 21c, and a seat state correction section 21d. The suitable figure acquisition section 21a is a program module that causes the control unit 20 to implement a function of acquiring a suitable figure that suits the current state of the seat 40 of the vehicle on the basis of suitable figure information 30b stored in the storage medium 30. That is, the control unit 20 outputs a control signal to the actuators 40a to 40d to cause the actuators 40a to 40d to output a signal that indicates the current state, and specifies the state (such as position and posture) of the movable portions on the basis of the signal to acquire a state of the seat 40.

A state of the seat 40 that is ideal for each figure can be defined in consideration of the fact that the cabin in the vehicle is a confined space with limited foot space, ceiling height, and so forth, and an ideal positional relationship between the object to be operated at the driver's seat, such as a pedal and a steering wheel, and the body. In the embodiment, the ideal state of the seat 40 has been defined in advance for each figure, and such a figure is called "suitable figure". Information obtained by correlating the state of the seat 40 and the suitable figure has been defined in advance as the suitable figure information 30b. In the embodiment, the figure is defined by the height, the sleeve length, the waist, and the inseam length. In the suitable figure information 30b, information that indicates the state of the movable portions of the seat 40 is correlated with the respective values of the height, the sleeve length, the waist, and the inseam which indicate the suitable figure. The control unit 20 references the suitable figure information 30b to acquire a suitable figure that suits the state of the seat 40. In the embodiment, a figure, a user with which takes a recommended driving posture in the case where the user is seated on the seat 40, is determined as the suitable figure, and the suitable figure information 30b is defined by correlating the suitable figure and the state of the seat.

Figure 5A:
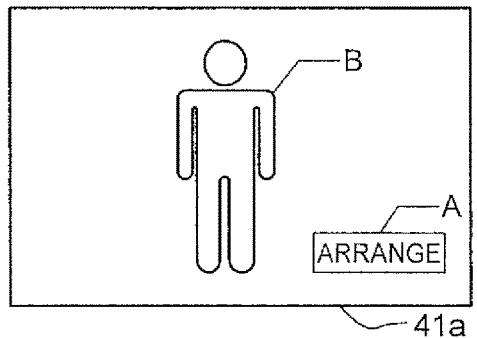
FIGS. 5A to 5E are each a display example of a screen of a touch panel display.

The suitable figure display section 21b is a program module that causes the control unit 20 to implement a function of displaying, on the touch panel display, an image that indicates the suitable figure which suits the current state of the seat 40. That is, the control unit 20 outputs a control signal to the user I/F unit 41, and displays, on the touch panel display, an image that indicates the suitable figure for reference for figure correction. The image that indicates a suitable figure may be an illustration of a figure for reference before correction. In the embodiment, an image that schematically illustrates a human body is displayed on the touch panel display. FIG. 5A illustrates a display example of a screen 41a of the touch panel display. The display example illustrates a state in which an icon B which is an image that schematically illustrates a human body is displayed. As a matter of course, the size of the icon B and the size of an image corresponding to each part of the human body may be varied in accordance with the numerical value of the suitable figure.

The figure correction reception section 21c is a program module that causes the control unit 20 to implement a function of receiving figure correction of the suitable figure through contact on the touch panel display. That is, the user I/F unit 41 outputs, to the control unit 20, a signal that indicates an operation through contact on the touch panel display, and the control unit 20 receives an instruction of the object to be corrected and the correction amount on the basis of the signal. In the embodiment, the control unit 20 receives correction of the size of each part of the body in the image which illustrates the suitable figure as figure correction. In the embodiment, a part (head, upper body, and legs) that constitutes the height, arms (i.e. the sleeve length), the waist, and the inseam (i.e. the inseam length) are to be corrected by varying (such as pinching out and pinching in) the positions of contact on the touch panel display.

Figure 5B:
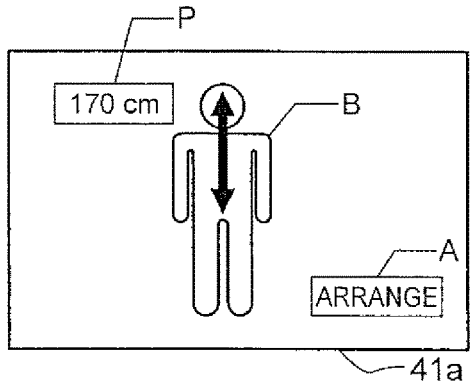

FIG. 5B illustrates an example of a touch operation performed to correct the size of a part that constitutes the height. The arrow indicated in the drawing indicates that a pinch-out operation has been performed in the up-down direction for the upper body portion of the icon B. In this case, the control unit 20 specifies that the position of the pinch-out operation is the upper body of the icon B and that the direction of the operation is the up-down direction to consider that an instruction for correcting the size of a part that constitutes the height has been provided. In addition, a correction amount is specified in accordance with the operation amount of the pinch-out operation.

In the embodiment, in the case where a part of the body to be corrected is specified, the control unit 20 outputs, to the user I/F unit 41, a signal that indicates a numerical value (the initial value of which is the numerical value of the suitable figure) currently specified for the part of the body, and makes pop-up display on the touch panel display. FIG. 5B illustrates a state in which pop-up display of the numerical value of the height has been made in a rectangular icon P. Furthermore, the control unit 20 specifies a numerical value after correction on the basis of the numerical value of the suitable figure and the correction amount each time correction is made through a touch operation, outputs a signal that indicates the numerical value to the user I/F unit 41, and makes pop-up display on the touch panel display.

In the embodiment, the control unit 20 specifies that the object to be corrected is the arms in the case where a touch operation is performed along the length direction of an arm on an arm portion of the image which indicates the suitable figure, specifies that the object to be corrected is the waist in the case where a touch operation is performed in the left-right direction on the upper body portion of the image which indicates the suitable figure, and specifies that the object to be corrected is the inseam in the case where a touch operation is performed along the length direction of a leg on a leg portion of the image which indicates the suitable figure.

The seat state correction section 21d is a program module that causes the control unit 20 to implement a function of correcting the state of the seat 40 so as to suit the figure correction received through processing performed by the figure correction reception section 21c. That is, the respective states of the movable portions which constitute the seat 40 and the suitable figure which suits the respective states have been defined in advance as the suitable figure information 30b. Therefore, if the figure after correction is considered to be the suitable figure, a state of the seat 40 corresponding to the figure after correction can be specified as the suitable figure information 30b. Thus, the control unit 20 outputs a control signal to the actuators 40a to 40d to cause the movable portions of the seat 40 to operate such that the state of the seat 40 suits the figure after correction. As a result, the control unit 20 corrects the state of the seat 40 so as to achieve a state corresponding to the suitable figure corrected by the user.

As described above, in the embodiment, figure correction of the suitable figure is received through contact on the touch panel display, and the state of the seat 40 is corrected so as to suit the figure correction. That is, when receiving an instruction for correcting the state of the seat 40, direct correction of the state of the seat 40 (such as correction of the seat position) is not received, but indirect correction, that is, figure correction of the suitable figure, is received. According to the configuration, the user can correct the state of the seat 40 using information that is easily recognizable by the user himself/herself, namely the figure. In addition, since the object to be corrected is the figure, it is easy to provide a correction instruction for achieving a state of the seat 40 that suits the figure.

In the embodiment, further, in order to correct the state of the seat 40, information on the figure itself is not input, but an instruction for figure correction can be provided by providing an instruction for correcting the figure with reference to the suitable figure through contact on the touch panel display. Thus, the state of the seat 40 can be corrected to suit the figure through easy input. In the embodiment, further, correction of the size of each part of the body in the image which illustrates the suitable figure is received as figure correction. Thus, the figure can be corrected for each different part in the case where the suitable figure and the figure of the user himself/herself are different from each other. In addition, correction can be made for a particular part of the body in the case where the user feels that the current state of the seat 40 does not suit the particular part of the body. Furthermore, correction can be made intuitively for each part of the body.

(2) Seat State Correction Processing

Next, seat state correction processing executed in accordance with the seat state correction program 21 will be described in detail. FIG. 2 is a flowchart illustrating the seat state correction processing. In the embodiment, with the navigation program executed, the seat 40 and a seater on the seat 40 (e.g. the name etc. of the seater) are designated by the user I/F unit 41, and thereafter the seat state correction processing for the seater is executed in the case where an instruction for starting correction of the seat state is provided. In the seat state correction processing, through processing performed by the suitable figure acquisition section 21a, the control unit 20 acquires a state of the seat 40 (step S100). That is, the control unit 20 acquires a state of the seat 40 by outputting a control signal to the respective actuators 40a to 40d for the seat 40 and specifying the state of the movable portions. Next, through processing performed by the suitable figure acquisition section 21a, the control unit 20 acquires a suitable figure (step S105). That is, the control unit 20 references the suitable figure information 30b to acquire a suitable figure that suits the state of the seat 40 acquired in step S100.

Next, through processing performed by the suitable figure display section 21b, the control unit 20 displays the suitable figure (step S110). That is, the control unit 20 outputs a control signal to the user I/F unit 41, and displays, on the touch panel display, an image that indicates the suitable figure. As a result, the icon B which is an image that schematically illustrates a human body is displayed on the touch panel display as on the screen 41a illustrated in FIG. 5A.

Next, through processing performed by the figure correction reception section 21c, the control unit 20 determines whether or not a figure correction instruction has been provided (step S115). That is, the control unit 20 determines, on the basis of an output signal from the user I/F unit 41, whether or not a touch operation for correcting the size of a part of the body has been performed on the image which indicates the suitable figure and which is displayed on the touch panel display. In the case where it is determined in step S115 that a figure correction instruction has been provided, through processing performed by the figure correction reception section 21c and the seat state correction section 21d, the control unit 20 executes figure input processing (step S120). When the figure input processing has been executed, the state of the seat 40 has been corrected so as to suit the figure after correction. The figure input processing will be discussed in detail later.

In the case where it is not determined in step S115 that a figure correction instruction has been provided, on the other hand, the control unit 20 executes processing for correlating a road attribute and a state of the seat 40. That is, in the seat state correction processing illustrated in FIG. 2, in order to reproduce a particular state of the seat 40 after the seat 40 is adjusted to the state, the state of the seat 40 and other information are stored in the storage medium 30 in correlation with each other. Specifically, road attribute correlation information 30c in which a state of the seat 40 and a road attribute of a road traveled on by the vehicle in the state are correlated with each other is defined for each seater, and stored in the storage medium 30. Therefore, in the case where it is not determined in step S115 that a figure correction instruction has been provided, through processing performed by the figure correction reception section 21c, the control unit 20 acquires a main road attribute from a preceding travel history (step S125). That is, the processing in step S125 is executed with the figure not corrected, and therefore the current state of the seat 40 can be estimated to be the same as the state of the seat 40 in the preceding travel.

Thus, by acquiring a main road attribute from a preceding travel history, the main road attribute can be considered as the road attribute corresponding to the current state of the seat 40. In step S125, the control unit 20 references information (not illustrated) that indicates the preceding travel history, and references the map information 30a for each of the roads traveled on indicated by the travel history to specify the road attribute. Furthermore, the control unit 20 accumulates the distance of the roads traveled on for each road attribute, and acquires the road attribute, the travel distance for which is the longest, as the main road attribute. As a matter of course, the processing is exemplary, and the road attribute, the travel time for which is the longest, may be determined as the main road attribute, for example.

Next, through processing performed by the figure correction reception section 21c, the control unit 20 correlates the road attribute acquired in step S125 and the current state of the seat 40 (the state of the seat 40 acquired in step S100) with each other, and stores such information in the storage medium 30 as the road attribute correlation information 30c for the seater designated when execution of the seat state correction processing is started (step S130). As a result, the state of the seat 40 for each road attribute can be defined automatically to be stored as the road attribute correlation information 30c for each seater.

In the case where the figure input processing is performed in step S120, or in the case where the road attribute correlation information 30c is stored in step S130, through processing performed by the figure correction reception section 21c, the control unit 20 determines whether or not an adjustment instruction for adjusting the state of the seat 40 in accordance with the taste of the seater has been input (step S135). That is, with step S120 or step S130 executed, the state of the seat 40 has been corrected so as to suit the figure after correction, or the state of the seat 40 has not been corrected. In the embodiment, it is possible to input whether or not it is necessary to make an adjustment in accordance with the taste of the seater from either state.

That is, in the embodiment, the control unit 20 is configured to output a control signal to the user I/F unit 41, and to display, on the touch panel display, an adjustment instruction button for adjusting the state of the seat 40 in accordance with the taste of the seater. FIGS. 5A and 5B each illustrate an example in which a button A with a text saying "Arrange" is displayed as the adjustment instruction button for adjusting the state of the seat 40 in accordance with the taste of the seater. In the case where the button A is touched, the user I/F unit 41 outputs a signal indicating that the button A has been touched. In step S135, the control unit 20 determines, on the basis of the signal, that an adjustment instruction for adjusting the state of the seat 40 in accordance with the taste of the seater has been input. In the case where it is not determined in step S135 that an adjustment instruction for adjusting the state of the seat 40 in accordance with the taste of the seater has been input, the control unit 20 terminates the seat state correction processing.

In the case where it is determined in step S135 that an adjustment instruction for adjusting the state of the seat 40 in accordance with the taste of the seater has been input, on the other hand, through processing performed by the figure correction reception section 21c and the seat state correction section 21d, the control unit 20 executes adjustment processing (step S140). That is, the control unit 20 receives the taste of the seater, and adjusts the state of the seat 40 in accordance with the taste of the seater.

Next, through processing performed by the figure correction reception section 21c, the control unit 20 correlates the road attribute selected in step S140 (the road attribute selected by the seater or the road attribute of a road to be traveled on, which will be discussed in detail later) and the state of the seat 40 after being adjusted in step S140 with each other, and stores such information in the storage medium 30 as the road attribute correlation information 30c for the seater designated when execution of the seat state correction processing is started (step S145).

(2-1) Figure Input Processing

Next, the figure input processing performed in step S120 will be described in detail. FIG. 3A is a flowchart illustrating the figure input processing. In the figure input processing, through processing performed by the figure correction reception section 21c, the control unit 20 acquires a portion to be corrected (step S200). That is, the control unit 20 specifies the position and the direction, on the touch panel display, of a touch operation performed on the basis of an output signal from the user I/F unit 41, and compares the specified position and direction with the image which indicates the suitable figure and which is displayed on the touch panel display to specify a part of the body, for which a body correction instruction has been provided. As a result, in the case where the portion to be corrected is specified to be a portion that constitutes the height, through processing performed by the figure correction reception section 21c, the control unit 20 determines in step S205 that the portion to be corrected is a portion that constitutes the height, and executes size setting processing for the portion which constitutes the height (step S210).

In the case where the portion to be corrected is specified to be the waist, through processing performed by the figure correction reception section 21c, the control unit 20 determines in step S215 that the portion to be corrected is the waist, and executes size setting processing for the waist (step S220). In the case where the portion to be corrected is specified to be the arms, through processing performed by the figure correction reception section 21c, the control unit 20 determines in step S225 that the portion to be corrected is the arms, and executes size setting processing for the arms on the basis of the determination made in step S225 (step S230). In the case where the portion to be corrected is specified to be the inseam, through processing performed by the figure correction reception section 21c, the control unit 20 determines in step S235 that the portion to be corrected is the inseam, and executes size setting processing for the inseam on the basis of the determination made in step S235 (step S240).

On the other hand, in the case where it is not determined that the portion to be corrected is any of a portion that constitutes the height, the waist, the arms, and the inseam, or in the case where the size setting processing in step S210, S220, S230, or S240 has been executed, through processing performed by the figure correction reception section 21c, the control unit 20 determines whether or not figure correction has been completed (step S245). That is, the control unit 20 determines, on the basis of an output signal from the user I/F unit 41, whether or not an instruction for completing figure correction has been provided through the UI (not illustrated) on the user I/F unit 41.

In the case where it is not determined in step S245 that figure correction has been completed, the control unit 20 repeats the processing in and after step S200. In the case where it is determined in step S245 that figure correction has been completed, on the other hand, through processing performed by the seat state correction section 21d, the control unit 20 corrects the state of the seat 40 (step S250). That is, the control unit 20 references the suitable figure information 30b to specify a state of the seat 40 that suits the size of the figure after correction acquired through the size setting processing in step S210, S220, S230, or S240. Then, the control unit 20 outputs a control signal to the respective actuators 40a to 40d to cause the movable portions to be operated such that the state of the seat 40 suits the size of the figure after correction.

(2-3) Size Setting Processing

Next, the size setting processing performed in step S210, S220, S230, and S240 will be described in detail. FIG. 3B is a flowchart illustrating the size setting processing. The size setting processing is executed with the size setting target (one of a portion that constitutes the height, the waist, the arms, and the inseam) specified. In the size setting processing, the control unit 20 makes pop-up display of a numerical value of the size setting target (step S300). That is, the control unit 20 outputs a control signal to the user I/F unit 41, and displays a current value (the initial value of which is a value specified from the suitable figure; after correction, a value obtained by adding or subtracting a correction amount to or from the initial value) of the size setting target at a position (such as a position in the vicinity of the position at which a touch operation has been performed as illustrated in FIG. 5B, for example) determined in advance for each size setting target.

Next, the control unit 20 determines whether or not the touch operation is a pinch-out (step S305). In the case where it is determined that the touch operation is a pinch-out, the control unit 20 increases the numerical value by a correction amount designated by the pinch-out (step S310). That is, in a pinch-out operation, in which the distance between contact positions is lengthened, a correction amount per unit distance has been determined in advance. The control unit 20 specifies a correction amount corresponding to the amount of variation in distance between contact positions in a pinch-out operation. Then, the control unit 20 increases the current value of the size setting target by the correction amount.

In the case where it is not determined in step S305 that the touch operation is a pinch-out, that is, in the case where the touch operation is a pinch-in, the control unit 20 decreases the numerical value by a correction amount designated by the pinch-in (step S315). That is, in a pinch-in operation, in which the distance between contact positions is shortened, a correction amount per unit distance has been determined in advance. The control unit 20 specifies a correction amount corresponding to the amount of variation in distance between contact positions in a pinch-in operation. Then, the control unit 20 decreases the current value of the size setting target by the correction amount.

Furthermore, the control unit 20 corrects the numerical value in the pop-up display (step S320). That is, the control unit 20 outputs a control signal to the user I/F unit 41, and displays the current value of the size setting target at the position determined in advance for each size setting target to correct the numerical value being displayed. Through the processing described above, pop-up display is changed and the numerical value of each part of the body is corrected in accordance with a touch operation.

(2-3) Adjustment Processing

Next, the adjustment processing performed in step S140 will be described in detail. FIG. 4 is a flowchart illustrating the adjustment processing. In the adjustment processing, the control unit 20 first determines whether or not there are registered data (step S400). That is, the control unit 20 references the storage medium 30, and determines that there are registered data in the case where the storage medium 30 stores at least a set of the road attribute correlation information 30c for the seater designated when execution of the seat state correction processing is started.

Next, the control unit 20 displays road attributes as alternatives (step S405). That is, the control unit 20 acquires road attributes correlated with the road attribute correlation information 30c for the seater designated when execution of the seat state correction processing is started. Then, the control unit 20 outputs, to the user I/F unit 41, a control signal for displaying, on the touch panel display, the acquired road attributes as alternatives. As a result, the road attributes are displayed as alternatives on the touch panel display.

Next, the control unit 20 receives a choice of a road attribute (step S410). That is, the control unit 20 acquires a signal output from the user I/F unit 41 upon selection of an alternative on the touch panel display, and specifies the selected alternative on the basis of the signal.

Next, the control unit 20 determines whether or not an instruction for termination of adjustment has been provided (step S415). That is, the control unit 20 outputs a control signal to the user I/F unit 41, displays a UI for providing an instruction for termination of adjustment on the screen on which the alternatives are displayed in step S405, and determines whether or not an instruction for termination of adjustment has been provided through the UI.

In the case where an instruction for termination of adjustment has been provided, the control unit 20 considers that an instruction indicating that adjustment may be terminated has been provided by selecting a road attribute. That is, in the case where it is determined in step S415 that an instruction for termination of adjustment has been provided, through processing performed by the seat state correction section 21d, the control unit 20 corrects the state of the seat 40 so as to achieve a state of the seat 40 that suits the selected road attribute (step S445). That is, the control unit 20 specifies a state of the seat 40 corresponding to the selected road attribute on the basis of the road attribute correlation information 30c, and outputs a control signal to the actuators 40a to 40d so as to achieve the specified state of the seat 40. As a result, the state of the seat 40 is corrected so as to achieve a state of the seat 40 corresponding to the selected road attribute. Thus, in the embodiment, a state of the seat 40 indicated by the road attribute correlation information 30*c* correlated with the selected road attribute is received as figure correction. Therefore, according to the embodiment, it is possible to easily reproduce a state of the seat 40 that suits the road attribute by only selecting the road attribute indicated by the road attribute correlation information 30*c*.

On the other hand, in the case where it is not determined in step S400 that there are registered data, or in the case where it is not determined in step S415 that an instruction for termination of adjustment has been provided, through processing performed by the figure correction reception section 21*c*, the control unit 20 receives an object to be adjusted (step S420). In the embodiment, the front-rear position of the seat surface portion, the angle of the backrest portion, and the back support strength of the side support of the backrest portion are adjustable. Therefore, in step S420, the control unit 20 determines, on the basis of an output signal from the user I/F unit 41, whether or not a tap operation has been performed on a particular portion in the image which indicates the suitable figure and which is displayed on the touch panel display. That is, in the case where a tap operation has been performed on a foot in the image which indicates the suitable figure, the control unit 20 acknowledges that the front-rear position of the seat surface portion is the object to be adjusted. In the case where a tap operation has been performed on the head in the image which indicates the suitable figure, meanwhile, the control unit 20 acknowledges that the angle of the backrest portion is the object to be adjusted. In the case where a tap operation has been performed on the center of the image which indicates the suitable figure, meanwhile, the control unit 20 acknowledges that the back support strength of the side support of the backrest portion is the object to be adjusted.

Figure 5C:
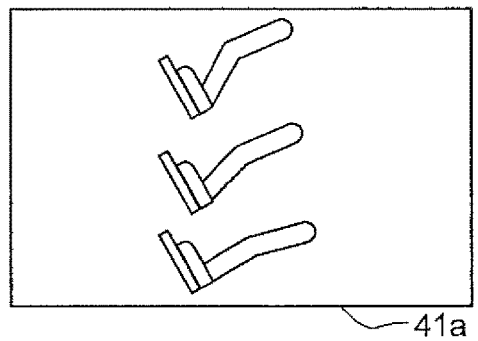
Figure 5D:
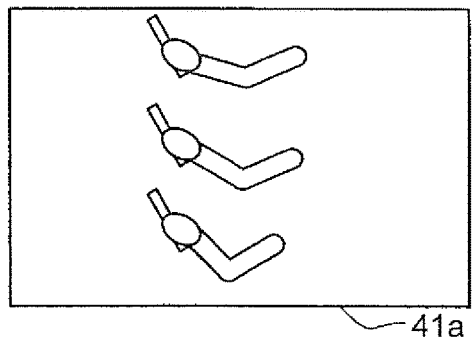
Figure 5E:
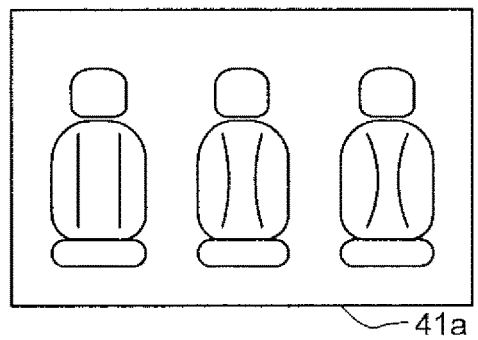

Next, through processing performed by the figure correction reception section 21*c*, the control unit 20 outputs a control signal to the user I/F unit 41 to display a plurality of alternatives with different adjustment states of the object to be adjusted (step S425). In the embodiment, in the case where the object to be adjusted is the front-rear position of the seat surface portion or the angle of the backrest portion, the control unit 20 displays, on the touch panel display, a plurality of alternatives with different positional relationships between an object to be operated in the cabin of the vehicle and a part of the body. FIGS. 5C to 5E each illustrate a display example of the alternatives. FIG. 5C illustrates a display example of the alternatives for a case where the object to be adjusted is the front-rear position of the seat surface portion, and illustrates a plurality of alternatives with different positional relationships between a pedal (a brake pedal or an accelerator pedal), which is the object to be operated, and a foot.

FIG. 5D illustrates a display example of the alternatives for a case where the object to be adjusted is the angle of the backrest portion, and illustrates a plurality of alternatives with different positional relationships between a steering wheel, which is the object to be operated, and the arms. FIG. 5E illustrates a display example of the alternatives for a case where the object to be adjusted is the back support strength of the side support, and illustrates a plurality of alternatives with different states of the side support in schematic views of the seat 40. That is, it is pictorially indicated that the support strength becomes higher toward the schematic view on the right.

Next, through processing performed by the figure correction reception section 21*c*, the control unit 20 receives a choice of any of the displayed alternatives (step S430). That is, the control unit 20 specifies an alternative selected by the seater on the basis of an output signal from the user I/F unit 41. Furthermore, through processing performed by the figure correction reception section 21*c*, the control unit 20 receives a choice of a road attribute (step S440). That is, the control unit 20 outputs a control signal to the user I/F unit 41 to display possible road attributes of a road to be traveled on by the vehicle as alternatives, and receives a road attribute selected by the seater on the basis of an output signal from the user I/F unit 41. Here, the seater selects a road attribute of a road to be traveled on by the vehicle after adjustment of the seat 40. Thus, the control unit 20 considers that the selected road attribute and the state of the seat 40 after adjustment correspond to each other.

Next, through processing performed by the seat state correction section 21*c*, the control unit 20 corrects the state of the seat 40 so as to achieve the adjustment state, received in step S430 (step S445). That is, the state of the movable portions after adjustment for each of the alternatives displayed in step S425 has been determined in advance. For example, in the case where the object to be adjusted is the front-rear position of the seat surface portion, the position of the seat surface portion is correlated with each of the alternatives. Similarly, the angle of the backrest portion is correlated with each of the alternatives in the case where the object to be adjusted is the angle of the backrest portion, and the position after adjustment of the side support is correlated with each of the alternatives in the case where the object to be adjusted is the back support strength of the side support.

Thus, the control unit 20 outputs a control signal to the actuators 40*a* to 40*d* so as to achieve a state of the movable portions that matches the alternative. As a result, the state of the seat 40 is corrected so as to achieve the state of the movable portions after adjustment for each of the alternatives displayed in step S425. As has been described above, in the embodiment, figure correction that suits the seat 40 is received by allowing selection of one of the alternatives displayed in step S425. That is, in the case where the driver is the seater, the state of the seat 40 is good if the state of the seat 40 is suitable for driving. In the case where the positional relationship between an object to be operated in the cabin and a part of the body does not match the taste of the seater, the driver often feels that the state of the seat 40 does not match the taste of the seater. Thus, if the system is configured to display, on the touch panel display, a plurality of alternatives with different positional relationships between an object to be operated in the cabin of the vehicle and a part of the body, and to receive a choice of any of the alternatives as figure correction, it is possible to allow the seater to select a state that suits his/her taste extremely easily.

(3) Other Embodiments

The embodiment described above is an example, and a variety of other embodiments can be adopted as long as figure correction of the suitable figure is received through contact on the touch panel display. For example, the seat state correction system may be implemented by a system other than the navigation system, such as a computer mounted on the vehicle or a computer carried by a passenger of the vehicle, for example. In addition, the seat 40 may be a seat other than the driver's seat. In addition, the object for correction of the figure is not limited to the objects discussed above, and the weight may be corrected, for example. For example, it is possible to adopt a configuration in which the value of the weight can be corrected through contact on the touch panel display, and in which the waist is specified from the value of the weight after correction to suitably correct the figure.

Furthermore, the suitable figure acquisition means may be configured to acquire a suitable figure that suits the current state of the seat of the vehicle on the basis of the suitable figure information in which the suitable figure and the state of the seat are correlated with each other, the suitable figure being such a figure a user with which takes a recommended driving posture in the case where the user is seated on the seat. For example, respective states (particular adjustment states (such as a particular position and height) within the movable range) of movable portions (such as the seat surface, the backrest, the headrest, and the armrest) that constitute the seat and a suitable figure that suits the respective states are correlated in advance with each other. Then, with the correspondence stored in a predetermined storage medium or the like, the correspondence may be referenced to acquire a suitable figure corresponding to the state of the seat of the vehicle. The figure can be defined using various kinds of information, and may be a value that indicates the size of the entire body or the size of each part of the body, or may be classes of the size of the entire body or the size of each part of the body. Examples of the latter include classes of the height such as tall, medium, and short and classes of the waist such as stout, standard, and slender.

The suitable figure display means may be configured to display, on the touch panel display, an image that indicates a suitable figure that suits the current state of the seat. That is, the suitable figure display means may be configured to display, on the touch panel display, an image that indicates a suitable figure for reference for figure correction. The image that indicates a suitable figure may be an illustration of a figure for reference before correction, which may indicate a suitable figure using a picture, indicate a suitable figure using a numerical value (such as the height and the sleeve length), or indicate a suitable figure using a plurality of types of expressions. In any event, the suitable figure display means may be configured to generate an image that indicates a suitable figure on the basis of the suitable figure, and to display the image on the touch panel display to display a figure that serves as a reference.

The figure correction reception means may be configured to receive figure correction of the suitable figure through contact on the touch panel display. That is, the figure correction reception means may be configured to provide an instruction for an object to be corrected, a correction amount, and so forth by an operation through contact on the touch panel display. A variety of operations can be assumed as the operation through contact. A variety of configurations can be adopted. For example, correction may be received through a contact operation performed on a slide bar or a button for indicating an increase or a decrease in numerical value, or may be received through variation in contact position (such as a pinch-out (an operation for lengthening the distance between contact positions) and a pinch-in (an operation for shortening the distance between contact positions)). In addition, a variety of contents can be assumed as the content to be corrected. For example, a difference between the suitable figure for reference and the figure of the user himself/herself may be corrected in the case where the suitable figure and the figure of the user are different from each other, or an instruction for figure correction may be provided such that a portion of the current state of the seat that does not suit the taste of the user himself/herself is corrected so as to suit the taste of the user.

The seat state correction means may be configured to correct the state of the seat on the basis of the suitable figure information so as to achieve a state of the seat corresponding to the corrected suitable figure. That is, the respective states of the movable portions which constitute the seat and the suitable figure which suits the respective states have been correlated in advance with each other. Therefore, a state of the seat corresponding to the figure after correction can be specified with reference to the correlation. Thus, the movable portions of the seat may be operated (moved, changed in inclination angle, etc.) so as to achieve such a state of the seat.

A variety of techniques can be adopted as the figure correction technique. For example, the figure correction reception means may be configured to receive correction of the size of each part of the body as figure correction. According to the configuration, figure correction can be executed in detail. For example, the figure can be corrected for each different part in the case where the suitable figure and the figure of the user himself/herself are different from each other. In addition, correction can be made for a particular part of the body in the case where the user feels that the current state of the seat does not suit the particular part of the body. Correction can be made for each part of the body more intuitively in a configuration in which correction of the size of each part of the body in the image which indicates the suitable figure can be received as figure correction.

Furthermore, the figure correction reception means may be configured to display, on the touch panel display, a plurality of alternatives with different positional relationships between an object to be operated in a cabin of the vehicle and a part of a body, and to receive a choice of any of the alternatives as the figure correction. That is, the state of the driver's seat is good if the state of the driver's seat is suitable for driving. In the case where the positional relationship between an object to be operated in the cabin and a part of the body does not match the taste of the user, the user often feels that the state of the seat does not match the taste of the user. Thus, if the system is configured to display, on the touch panel display, a plurality of alternatives with different positional relationships between an object to be operated in the cabin of the vehicle and a part of the body, and to receive a choice of any of the alternatives as figure correction, it is possible to allow the user to select a state that suits his/her taste extremely easily.

Furthermore, the figure correction reception means may be configured to store, in the storage medium, the road attribute correlation information in which the state of the seat and the road attribute of a road traveled on by the vehicle in the state are correlated with each other, to display, on the touch panel display, road attributes correlated with the road attribute correlation information stored in the storage medium as alternatives, to receive a choice of any of the alternatives, and to receive the state of the seat indicated by the road attribute correlation information correlated with the selected road attribute as figure correction. That is, an ideal state of the seat may be varied in accordance with the road attribute. For example, an ideal state of the seat during travel on a highway and an ideal state of the seat during travel on a general road may be different from each other. Therefore, it is easy to achieve a desired state of the seat if a plurality of states of the seat can be registered in correlation with the road attributes and can be reproduced on the basis of the road attribute.

Thus, if the road attribute of a road traveled on by the vehicle and the state of the seat for a case where the vehicle travels on the road have been stored in correlation with each other as the road attribute correlation information, a state of the seat that suits a road attribute can be reproduced by only selecting the road attribute indicated by the road attribute correlation information. As a matter of course, various kinds of information can be assumed, beside the road attribute, as information that can be correlated with the state of the seat when a plurality of states of the seat are to be registered and reproduced. For example, information for specifying an individual to be seated on the seat or the like may be correlated with the state of the seat.

Furthermore, the figure correction reception means may be configured to specify a main road attribute of a road traveled on in the preceding travel on the basis of a preceding travel history of the vehicle, and to store, in the storage medium, the specified road attribute and the current state of the seat in correlation with each other as the road attribute correlation information. That is, the current state of the seat (the state at the time when the preceding travel has been finished and before figure correction is performed) can be considered to suit the main road attribute of a road traveled on by the vehicle in the preceding travel. Thus, the road attribute correlation information can be defined automatically if the main road attribute of a road traveled on by the vehicle in the preceding travel and the current state of the seat are correlated with each other as the road attribute correlation information.

Furthermore, the technique of receiving figure correction of the suitable figure through contact on the touch panel display can be implemented as a program or a method. The seat state correction system, program, and method described above include various aspects such as those implemented using a single seat state correction system and those implemented utilizing parts that are common to various portions provided in the vehicle. For example, a navigation system, method, and program that include the seat state correction system described above can be provided. Various changes may be made. For example, some units may be implemented using software, and the others may be implemented using hardware. Embodiments may also be implemented as a storage medium for a program that controls the seat state correction system. As a matter of course, the storage medium for the software may totally equally be a magnetic storage medium, a magneto-optical storage medium, or any storage medium that may be developed in the future.

The invention claimed is:

1. A seat state correction system comprising:
 a memory that stores road category correlation information in which a state of the seat and a road category of a road traveled on by the vehicle with the seat in the state are correlated with each other for a plurality of road category; and
 a processor programed to:
  access suitable figure information in which a suitable figure and a state of a seat of a vehicle are correlated with each other;
  acquire a suitable figure that suits a current state of the seat on the basis of the accessed suitable figure information, the acquired suitable figure representing a recommended driving posture for a user seated on the seat;
  display, on a touch panel display:
   an image that indicates the acquired suitable figure; and
   the road categories correlated with the road category correlation information stored in the storage medium as alternatives;
  receive figure correction information through contact on the touch panel display, the figure correction information either:
   indicating a correction of the displayed suitable figure; or
   the state of the seat indicated by the road category correlation information correlated with a selected one of the displayed road categories; and
  correct the state of the seat on the basis of the accessed suitable figure information so as to achieve a state of the seat corresponding to the figure correction information.

2. The seat state correction system according to claim 1, wherein the processor is programmed to:
 receive correction of a size of each part of a body of the user as the figure correction.

3. The seat state correction system according to claim 2, wherein the processor is programmed to:
 receive a correction of the size of each part of the body of the user in the image which indicates the suitable figure as the figure correction.

4. The seat state correction system according to claim 1, wherein the processor is programmed to:
 display, on the touch panel display, a plurality of alternatives with different positional relationships between an object to be operated in a cabin of the vehicle and a part of a body of the user; and
 receive a choice of one of the displayed alternatives as the figure correction.

5. The seat state correction system according to claim 1, wherein the processor is programmed to:
 specify, on the basis of a preceding travel history of the vehicle, a main road category of a road traveled on in a preceding travel; and
 store, in the memory, the specified road category and the current state of the seat in correlation with each other as the road category correlation information.

6. The seat state correction system according to claim 1, wherein the road categories include a highway, a general road, and a narrow street.

7. A seat state correction method comprising:
 accessing a memory that stores road category correlation information in which a state of the seat and a road category of a road traveled on by the vehicle with the seat in the state are correlated with each other for a plurality of road categories;
 accessing suitable figure information in which a suitable figure and a state of a seat of a vehicle are correlated with each other;
 acquiring a suitable figure that suits a current state of the seat on the basis of the accessed suitable figure information, the acquired suitable figure representing a recommended driving posture for a user seated on the seat;
 displaying, on a touch panel display:
  an image that indicates the acquired suitable figure; and
  the road categories correlated with the road category correlation information stored in the storage medium as alternatives;
 receiving figure correction information through contact on the touch panel display, the figure correction information either:
  indicating a correction of the displayed suitable figure; or
  the state of the seat indicated by the road category correlation information correlated with a selected one of the displayed road categories; and correcting the state of the seat on the basis of the accessed suitable figure information so as to achieve a state of the seat corresponding to the figure correction information.

8. The seat state correction method according to claim 7, wherein the road categories include a highway, a general road, and a narrow street.

9. A computer-readable storage medium storing a computer-executable seat state correction program that causes a computer to implement the following functions:
- accessing a memory that stores road category correlation information in which a state of the seat and a road category of a road traveled on by the vehicle with the seat in the state are correlated with each other for a plurality of road categories;
- accessing suitable figure information in which a suitable figure and a state of a seat of a vehicle are correlated with each other;
- acquiring a suitable figure that suits a current state of the seat on the basis of the accessed suitable figure information, the acquired suitable figure representing a recommended driving posture for a user seated on the seat;
- displaying, on a touch panel display:
  - an image that indicates the acquired suitable figure; and
  - the road categories correlated with the road category correlation information stored in the storage medium as alternatives;
- receiving figure correction information through contact on the touch panel display, the figure correction information either:
  - indicating a correction of the displayed suitable figure; or
  - the state of the seat indicated by the road category correlation information correlated with a selected one of the displayed road categories; and
- correcting the state of the seat on the basis of the accessed suitable figure information so as to achieve a state of the seat corresponding to the figure correction information.

10. A computer-readable storage medium of claim 9, wherein the road categories include a highway, a general road, and a narrow street.

* * * * *